US010179414B2

(12) United States Patent
Hanlon, Jr.

(10) Patent No.: US 10,179,414 B2
(45) Date of Patent: Jan. 15, 2019

(54) PROTECTIVE RING FOR AUTOMATED EQUIPMENT AXIS PIVOT POINTS

(71) Applicant: R.J. HANLON COMPANY, INC., Noblesville, IN (US)

(72) Inventor: Robert Joseph Hanlon, Jr., Noblesville, IN (US)

(73) Assignee: RJ Hanlon Company, Inc., Westfield, IN (US)

( * ) Notice: Subject to any disclaimer, the term of this patent is extended or adjusted under 35 U.S.C. 154(b) by 214 days.

(21) Appl. No.: 14/898,920

(22) PCT Filed: Jun. 16, 2014

(86) PCT No.: PCT/US2014/042482
§ 371 (c)(1),
(2) Date: Dec. 16, 2015

(87) PCT Pub. No.: WO2014/204836
PCT Pub. Date: Dec. 24, 2014

(65) Prior Publication Data
US 2016/0368152 A1    Dec. 22, 2016

Related U.S. Application Data

(60) Provisional application No. 61/836,256, filed on Jun. 18, 2013.

(51) Int. Cl.
*B25J 19/06* (2006.01)
(52) U.S. Cl.
CPC ..................... *B25J 19/06* (2013.01)

(58) Field of Classification Search
CPC .... B25J 19/0091; B25J 19/06; B25J 19/0025; B25J 19/0075; B25J 19/0079
See application file for complete search history.

(56) References Cited

U.S. PATENT DOCUMENTS

| | | | |
|---|---|---|---|
| 2,173,190 A | * | 9/1939 | Wilkening ................. F16J 9/20 277/460 |
| 4,110,943 A | | 9/1978 | Carlson |
| 5,711,710 A | | 1/1998 | Brisk |

(Continued)

FOREIGN PATENT DOCUMENTS

| | | |
|---|---|---|
| DE | 102016003080 A1 * | 9/2017 |
| JP | 2004-174643 | 6/2004 |

OTHER PUBLICATIONS

Define plastic—Google Search, google.com., May 25, 2018. (Year: 2018).*

(Continued)

Primary Examiner — Vinh Luong
(74) Attorney, Agent, or Firm — Ryan O. White; Taft Stettinius & Hollister LLP

(57) ABSTRACT

A protective covering support structure for an automated machine, comprising a first ring member having a channel extending substantially along an inner circumferential periphery, and a second ring member configured to be housed within the channel of the first ring member, the second ring member having a first end and a second end, the first and second ends being separated by a gap, wherein the first ring member is configured to be fixedly secured to the automated machine through a pressure-tight engagement.

8 Claims, 19 Drawing Sheets

(56) References Cited

U.S. PATENT DOCUMENTS

| | | | | |
|---|---|---|---|---|
| 5,806,615 A * | 9/1998 | Appleton | ............ | E21B 17/1078 138/110 |
| 5,816,736 A * | 10/1998 | Kroulik | ................ | B25J 19/0025 403/389 |
| 6,352,369 B1 | 3/2002 | Berninger | | |
| 6,543,307 B2 * | 4/2003 | Ambrose | ............ | B25J 19/0025 74/490.01 |
| 6,761,189 B2 * | 7/2004 | Berninger | ............ | B25J 19/0025 138/104 |
| 7,591,286 B2 * | 9/2009 | Howard | ................ | H02G 9/065 138/108 |
| 2011/0095457 A1 | 4/2011 | Sirkett et al. | | |
| 2015/0202009 A1 * | 7/2015 | Nussbaumer | .......... | A61B 46/27 128/856 |
| 2016/0242861 A1 * | 8/2016 | Flatt | ....................... | A61B 90/40 |

OTHER PUBLICATIONS

International Search Report PCT/US2014/042482 dated Oct. 13, 2014 (3 pages).
Written Opinion for PCT/US2014/042482 dated Oct. 13, 2014 (9 pages).
International Preliminary Report on Patentability for PCT/US2014/042482 dated Dec. 22, 2015 (10 pages).

* cited by examiner

PROTECTIVE RING FOR AUTOMATED EQUIPMENT AXIS PIVOT POINTS

CROSS-REFERENCE TO RELATED APPLICATIONS

This application is a U.S. national stage application under 35 U.S.C. § 371 of PCT International Application Serial No. PCT/US14/42482, which has an international filing date of Jun. 16, 2014, designates the United States of America, and claims priority to U.S. Provisional Patent Application Ser. No. 61/836,256, which was filed on Jun. 18, 2013. The disclosures of each of these prior applications are hereby expressly incorporated by reference in their entirety.

TECHNICAL FIELD

The present disclosure relates to a protective ring for an automated machine, and specifically, a ring designed to prevent premature wear or damage from occurring to a protective covering that is draped over an automated robotic machine as the machine moves about its axis pivot points.

BACKGROUND OF THE DISCLOSURE

The use of automated equipment has become very popular in many industries as a way to reduce cost, increase production, and reduce error. Automated equipment is used to perform many processes in various industries such as welding, paint finishing, and material handling to name a few. Manufacturers of automated equipment include companies like ABB, FANUC, and Dürr.

The use of automated equipment within industrial applications too dangerous or complex for direct human involvement is particularly popular. Such applications include painting booths, in part because of the potentially toxic environment a painting booth can create for human occupants. Further, automated equipment is frequently used in welding applications. This allows for more consistent weld quality and reduces the risk of injury to a human operator due to the extreme temperatures, toxic fumes, or airborne debris created during the process.

With the use of automated equipment to perform industrial tasks, comes the cost of maintaining and cleaning said equipment. With regards to a painting booth, because the paint is often applied to objects through a spraying application, the robotic equipment is susceptible to having some of the airborne paint particles accumulate on its surface, thereby potentially damaging the equipment and/or contaminating the object being painted, particularly if some of the wet or dried paint drips/sheds off during the process. Further the use of automated equipment for welding processes similarly puts the equipment at risk of being damaged by welding slag or the extreme temperatures. These costs have spawned the creation of several preventative measures to protect automated equipment.

One process that has been used to address the above-referenced problems is to cover the automated equipment with a water-soluble polymeric film, such as ENVIRO-FILM™, which is manufactured by RJ Hanlon Company, Inc. of Westfield, Ind. However, as the automated equipment can have more than 10 axis pivot points, protecting the equipment without snagging, tearing or causing the protective covering around the equipment to prematurely wear can prove difficult. As such, there is a need to prevent protective coverings from becoming damaged, torn or prematurely worn as the automated equipment is moved about its various axis pivot points. The present disclosure is intended to address and improve upon these and other known deficiencies and challenges of the prior art.

SUMMARY OF THE DISCLOSURE

In accordance with one aspect of the present disclosure, a ring structure capable of radially extending beyond one or more axis pivot points of an automated machine is disclosed. According to this embodiment, the ring structure is configured to have a radius that permits the ring to substantially extend beyond and encompass all parts of the machine lying within the same planar region of the ring. In accordance with certain aspects herein, the ring structure can be composed of two substantially similar portions that can be coupled to one another when placed radially around the automated machine.

According to another aspect of the present disclosure, a protective covering support structure for an automated machine is provided and comprises a first ring member having a channel extending substantially along an inner circumferential periphery and a second ring member configured to be housed within the channel of the first ring member, the second ring member having a first end and a second end, the first and second ends being separated by a gap. In accordance with this embodiment, the first ring member is configured to be fixedly secured to the automated machine through a pressure-tight engagement.

According to yet another aspect of the present disclosure, a protective covering support structure for an automated machine comprises a first arc member, a second arc member coupled to the first arc member, the first and second arc members together forming a substantially semicircular arc, an extension arm extending from at least one of the first and second arc members, and an adaptor plate coupled to extension arm, the adaptor plate being configured to be attached to the automated machine.

According to still another embodiment herein, a protective covering support structure for an automated machine comprises a first arc member, a second arc member coupled to the first arc member by at least one support cross member, a first bracket coupled to the first and second arc members at a first end, and a second bracket coupled to the first and second arc member at a second end. In accordance with this embodiment, the first and second brackets are each configured to attach to the automated machine.

In accordance with another aspect of the present disclosure, a protective covering support structure for an automated machine comprises an arc member having a first couple point and a second couple point, the first and send couple points being located at opposing ends of the arc member, a lip portion that extends from the arc member, the lip portion having an substantially rounded edge, a first spacer plate removably coupled to the first couple point, and a second spacer plate removably coupled to the second couple point. According to this embodiment, the arc member is configured to shield one or more axis joints of the automated machine.

According to still further embodiments of the present disclosure, a protective covering support structure for an automated machine comprises a first arc member, a second arc member coupled to the first arc member, the first and second arc members together forming a substantially semicircular arc, a first internal brace coupled to the first arc member, the first internal brace having a first opening for attachment to the automated machine, a second internal brace coupled to the second arc member, the second internal brace having a second opening for attachment to the automated machine, and a lip portion that extends from the first and second arc member, the lip portion is configured to be attached to a cover draping the automated machine.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
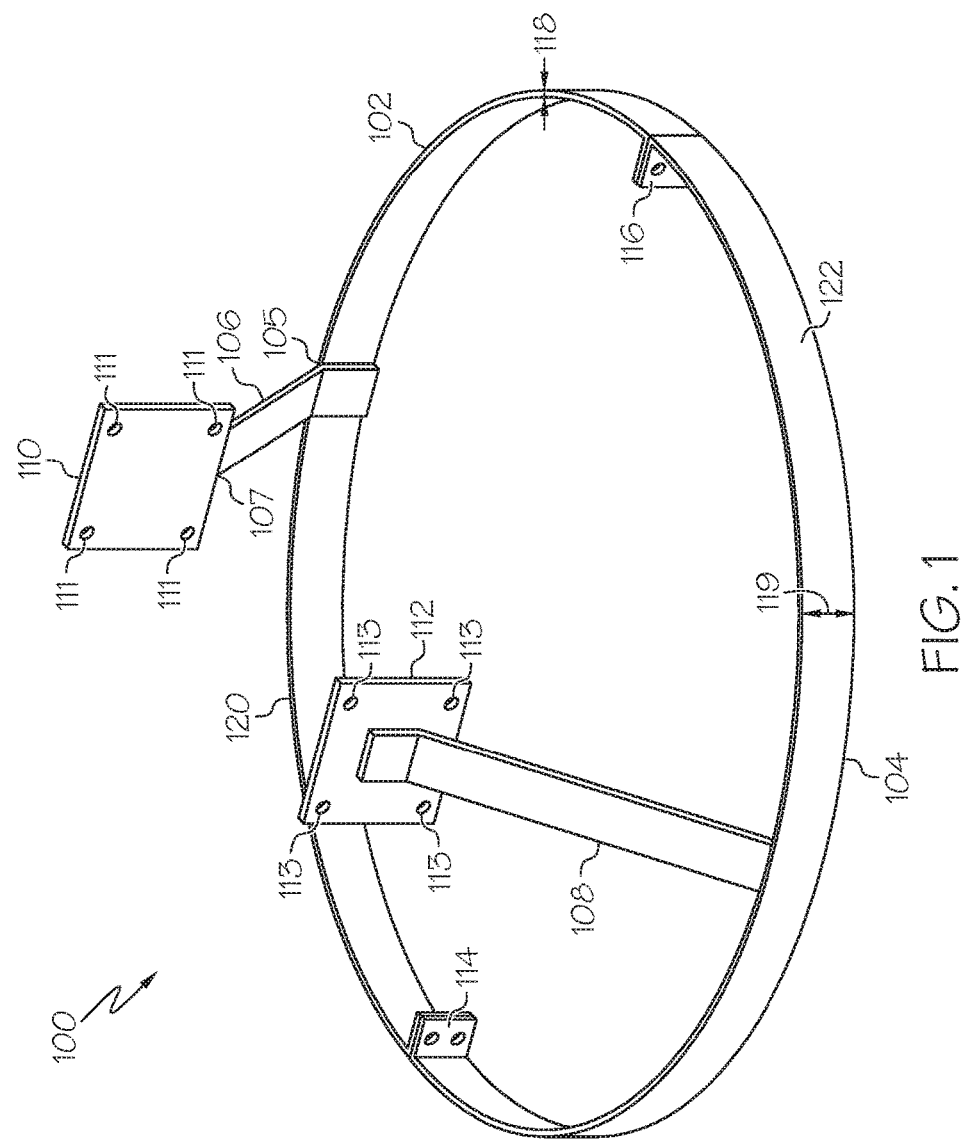
FIG. 1 is a perspective view of an offset ring assembly in accordance with the teachings of the present disclosure.

Referring now to FIG. 1, an offset ring assembly 100 is illustrated. The offset ring assembly contains both a first side 102 and a second side 104 that can be removably coupled to one another at a first couple point 114 and a second couple point 116. The first side 102 can have a first base member 120 that creates a substantially semicircular arc. The first base member 120 may have a substantially rectangular cross section (not shown) with a height 119 significantly greater than the width 118. Further, the first base member 120 can be oriented such that the radially outward face of the first base member 120 exposes the member height 119. While this particular embodiment illustrates two sides consisting of substantially 180° arcs to encompass a base member, one skilled in the art can understand how each side could be any combination of arc lengths as long as they combine to substantially encompass the base member. For instance, the first side could be 270° while the second side is 90°. One skilled in the art can understand the many variations that could be used to create a substantially encompassing ring around a base member by using two sides of differing or the same arc lengths. Furthermore, those of skill in the art can understand and appreciate herein that in accordance with certain aspects of the present disclosure (and as will be shown in more detail with respect to FIGS. 9-19, for instance), the ring assembly could be composed of a single arc, as opposed to two separate semicircular base members. In accordance with this illustrative aspect, the single arc could have a section removed from its structure so as to allow the arc to be flexibly manipulated as it is being fitted onto a robotic arm. In other words, a piece of the base material can be removed such that the two ends substantially adjacent to one another proximate the removed section could be pried away from one another as the arc is installed onto a robotic arm. As those of skill in the art would understand and appreciate herein, the base member can be made from a flexible material such as ultra-high molecular weight high density polyethylene (UHMW HDPE). Such a material will have the flexibility needed to allow the ends of the arc forming the base member to be pried apart from one another during the installation of the ring member, yet will still inherently possess the structural elasticity needed to allow the ends to rebound to their original position after the installation is complete.

Referring once again to FIG. 1, the ends of the first base member 120 can create a first couple point 114 and a second couple point 116. The first couple point 114 and the second couple point 116 can be created by bending the base member 120 radially inward approximately 90°. This may create a lip sufficient to allow a plurality of fasteners to hold the first side 102 and the second side 104 in substantially planar alignment. Further, instead of bending the base member 120 inward to form the first couple point 114 and the second couple point 116, the first couple point 114 and the second couple point 116 could be formed by separate tabs that are coupled to the first base member 120 and the second base member 122. The tabs can be coupled to each end of both the first base member 120 and the second base member 122 using a plurality of methods such as, but not limited to, welding, adhesives, or removable fasteners.

While this particular embodiment utilizes 90° bends or coupled tabs in both the first base member 120 and the second base member 122 to removably couple the first side 102 and the second side 104 to one another, such coupling means should not be seen as limiting. One skilled in the art could understand how a plurality of methods could be used to removably couple two sides of a ring to one another. For instance, the ring sides could overlap one another, allowing fasteners to couple the two sides together at the overlap. Further, a hinge could be located at the first couple point and a fastener could be located at the second couple point. This would allow the ring to be pivoted to an open position and moved into place around a parent object and then closed and fastened while encompassing the parent object. Many similar methods are possible to allow a ring to encompass a parent object and should be considered as incorporated herein.

The first side 102 may also have an extension member 106 coupled to the base member at a first end 105, and coupled to a first adaptor plate 110 on a second end 107. The extension member 106 may extend radially inward and be angularly offset from the inside wall of the first base member 120. The exact length and angular orientation of the first extension member 106 may vary from one application to the next and depends on the exact requirements of the parent member (e.g., robotic equipment) to which the ring is attached. Further, the extension member 106 may be coupled to both the base member 120 and the first adapter plate 110 using a plurality of methods such as welds, adhesives, or removable fasteners to name a few. The first extension member 106 may also be pivotal about both the base member 120 and the first adaptor plate 110. Further the first extension member 106 may be slidably adjustable in length. The first extension arm 106 can create a support structure that can fix the location of the first side 102 in comparison to a parent member to which the ring is attached.

The second end of the extension member 106 can be coupled to a first adapter plate 110. The first adaptor plate 110 can be configured to be removably coupled to a parent structure (see FIG. 2). In one instance, the first adaptor plate 110 can have a plurality of holes 111 there through, allowing the first adaptor plate 110 to be removably coupled to a parent member. In the alternative, the first adaptor plate 110 could have a hook or loop structure, or other such fastening means, thereby allowing it to be removably coupled to the parent member without the need for any special tools. The base plate could be coupled to the parent member using a plurality of methods, including but not limited to, welding, adhesive, removable fasteners and hook/loop configurations. One skilled in the art can realize the many ways a base plate can be coupled, either fixedly or removably to a parent member. Further, the parent member can be an automated machine that pivots about one or more axis points but should not be limited to such an application. One skilled in the art can understand how the above mentioned disclosure could be utilized to protect any type of machine that has one or more axis of motion, whether automated or controlled by an operator, and should not be seen as being limited to an automated machine.

Similarly, the offset ring assembly 100 can contain a second side 104 that can be a substantially mirrored image of the first side 102 as described above. Further, all of the details regarding the first side 102 should be considered incorporated herein to describe the second side 104.

The second side 104 can have a second base member 122. The second base member 122 can consist of a first couple point 114 and a second couple point 116 at either end of the second base member 122. The first couple point 114 and the second couple point 116 can have 90° bends on either side of the second base member 122 or tabs coupled to either side of the second base member 122. Similarly to the first side 102, the second side 104 can have a second extension member 108 that is coupled to the second base member 122 on one end and to a second adaptor plate 112 on the other end. The second adaptor plate 112 can contain a plurality of through holes 113 therein to allow the second adaptor plate 112 to be removably coupled to a parent member.

Figure 2:
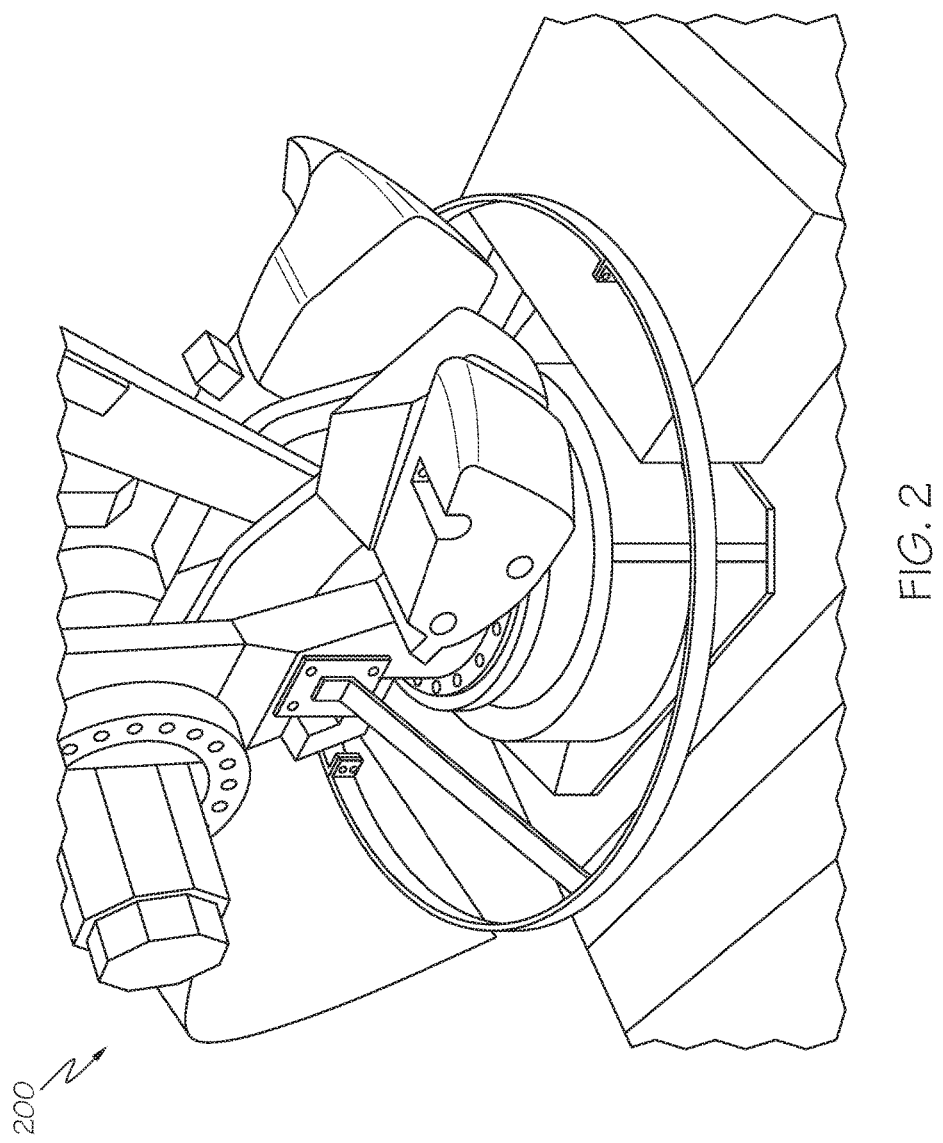
FIG. 2 is a perspective view of the offset ring assembly of FIG. 1, shown coupled to a parent member.

The first side 102 and the second side 104 can be coupled to one another at the first couple point 114 and the second couple point 116 to create a substantially circular ring around the parent member (see FIG. 2). The substantially circular ring can have a diameter at least large enough to fully encompass the parent member and is ideally located at an axis point of a robotic arm 200 (See FIG. 2). Further, the parent member can have a location for removably coupling both the first adaptor plate 110 and the second adaptor plate 112 thereon. Once the first adaptor plate 110 and the second adaptor plate 112 are coupled to the parent member, the first couple point 114 of the first base member 120 and the second base member 122 are coupled to one another, and the second couple point of both the first base member 120 and the second base member 122 are coupled to one another, the offset ring assembly 100 can be substantially rigidly mounted to encompass the parent member about a desired location.

The radially exterior portion of both the first base member 120 and the second base member 122 can act as a guide or a mounting point for any exterior protection the parent member might need. By locating the offset ring assembly 100 around an axis of movement for the parent member, the offset ring assembly 100 can reduce the possibility of a protective cover getting snagged or wearing prematurely because of the movement about the axis. Further, the use of an offset ring assembly 100 about an axis of a robot that deals with harsh chemicals (i.e. a paint booth) can allow a protective cover to keep the harsh chemicals from prematurely deteriorating the gaskets and seals located at the axis points.

Figure 3:
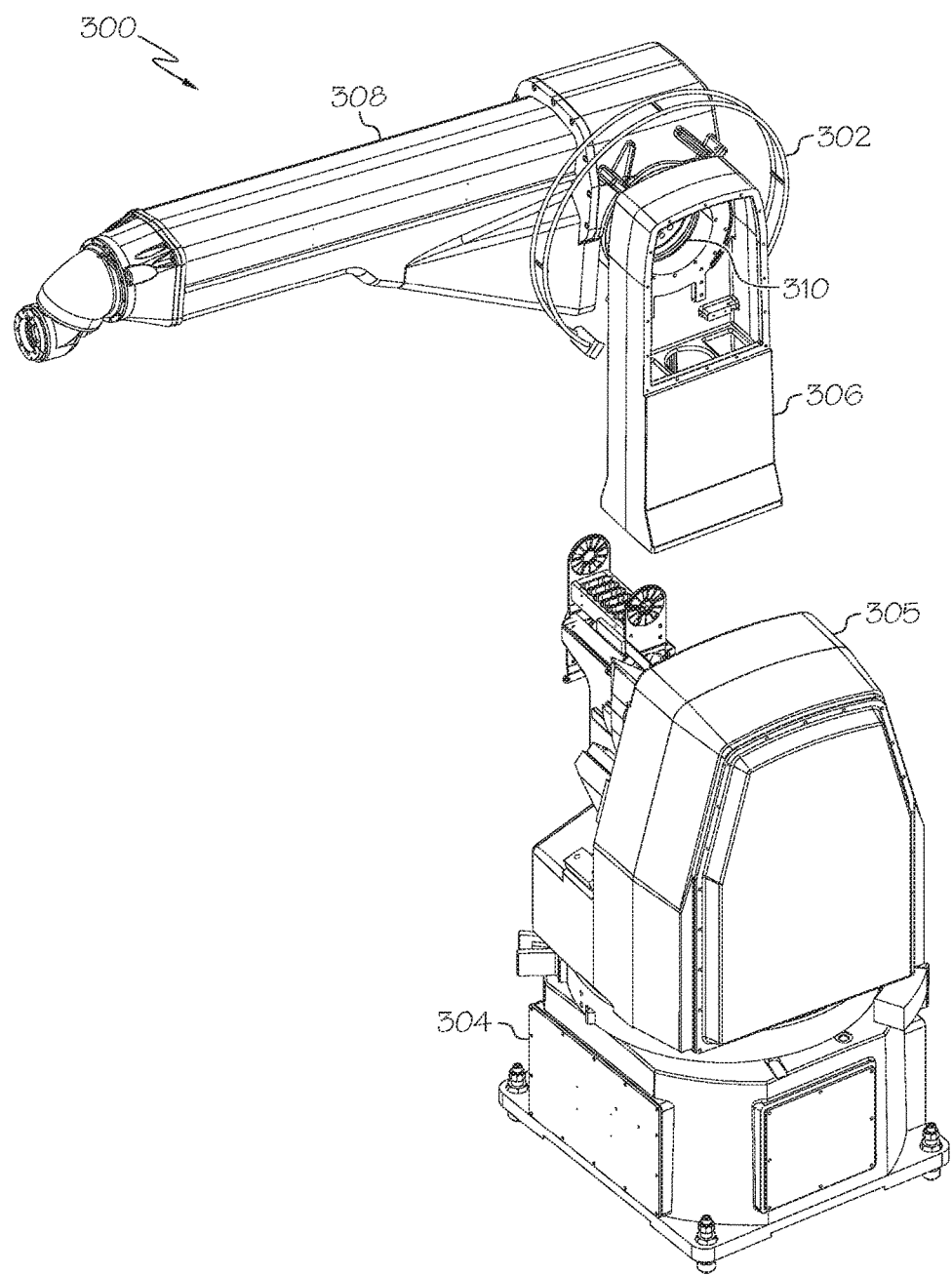
FIG. 3 is a perspective view of a rail ring assembly coupled to a robotic arm in accordance with the teachings of the present disclosure.
Figure 4:
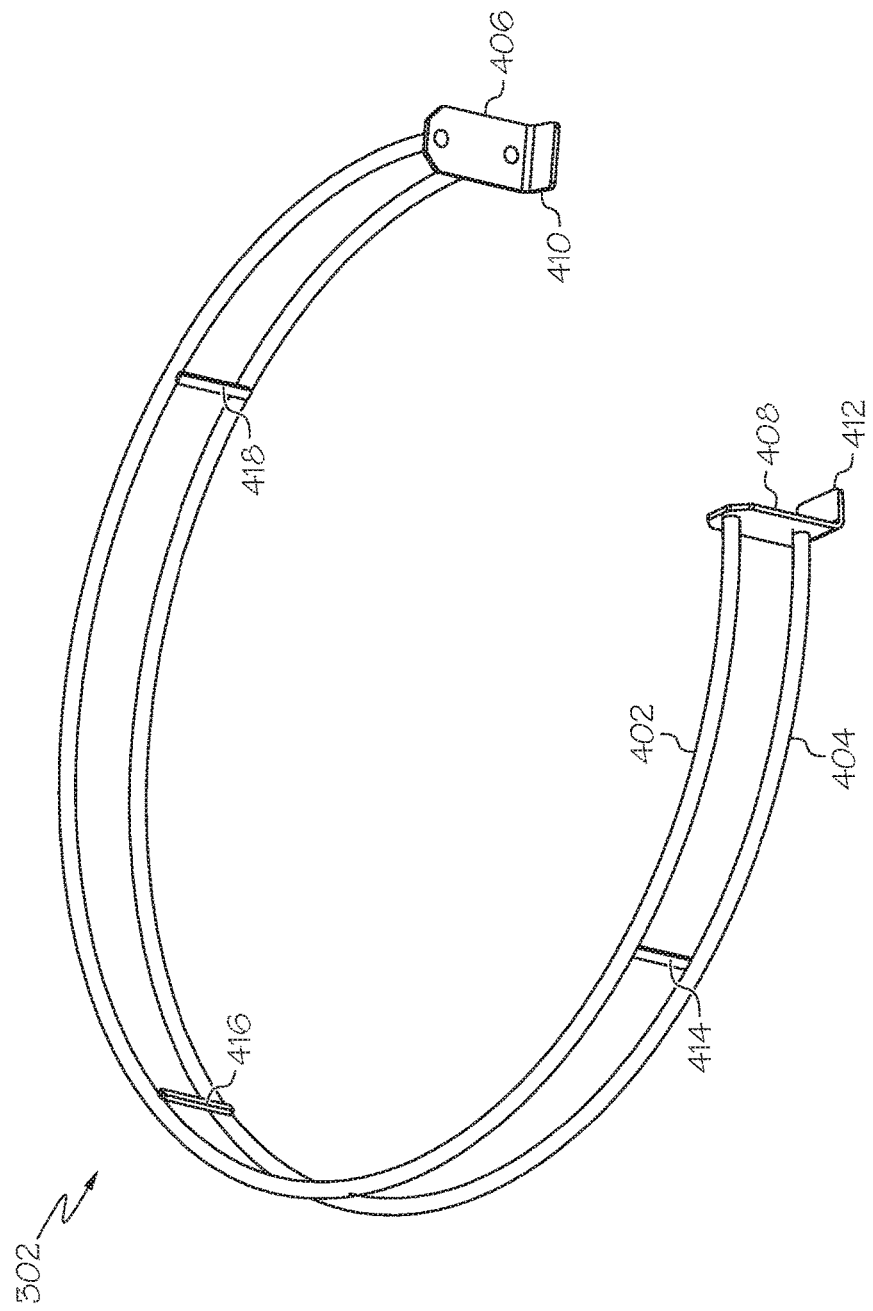
FIG. 4 is a detailed perspective view of the rail ring assembly of FIG. 3.

Referring to FIGS. 3 and 4, another embodiment of the current disclosure involves a rail ring 302 located on a robotic arm assembly 300. In accordance with this illustrative embodiment, a robotic arm assembly consists of a base 304, a second robotic member 305, a third robotic member 306, and a fourth robotic member 308. In this specific embodiment, the rail ring 302 is disposed at least partially around a pivot axis 310 connecting the third member 306 with the fourth member 308. Of course, those of skill in the art will appreciate and understand herein that the rail ring 302 could be attached in accordance with another configuration depending on the specific circumstance involved. As such, the present disclosure is not intended to be limited herein.

FIG. 4 illustrates the rail ring 302 in more detail. Specifically, the rail ring can be composed of a first arced bar 402 and a second arced bar 404. The first arced bar 402 and the second arced bar 404 can be coupled to one another by a first support cross member 414, a second support cross member 416, and a third support cross member 418 along with the first couple point 406 and the second couple point 408. Each of the three cross members 414, 416, and 418 can be coupled to both the first arced bar 402 and the second arced bar 404 be means of welding, gluing, or fastening or any similar method. Further, each of the three cross members 414, 416, and 418 can have substantially the same length and be spaced equally from one another to provide sufficient support between the first arced bar 402 and the second arced bar 404.

The first arced bar 402 and the second arced bar 404 can create a consistent diameter arc. The arc can be sufficient to adequately clear the moving components of both the third robotic member 306 and the fourth robotic member 308 when coupled to the robotic arm assembly 300. The first arced bar 402 and the second arced bar 404 can have substantially similar arc lengths. Further, the specific arc length of the first arced bar 402 and the second arced bar 404 can vary depending on the application and can be sufficient to allow the rail ring 302 to be placed over a pivot axis 310 of a robotic arm. One skilled in the art could understand how the length of arcs in the rail ring depends on the desired motion of the robotic assembly and the size of the pivot axis being encompassed. The diameter of the rail ring can be sufficient to encompass the pivot axis of a robotic arm while the arc length can vary to be any size sufficient to fit over the pivot axis and provide the required protection.

The rail ring 302 can also have a first couple point or bracket 406 and a second couple point or bracket 408. The first couple point 406 can have a first couple lip 410 and the second couple point 408 can have a second couple lip 412. The first couple point 406 and the second couple point 408 can provide a substantially flat surface that can be used to removably or fixedly couple the rail ring 302 to a robotic arm. The first couple lip 410 and the second couple lip 412 can ensure proper alignment between the rail ring 302 and the robotic arm when the rail ring 302 is being coupled thereto. Further, the first couple lip 410 and the second couple lip 412 can provide additional structural integrity to the rail ring 302 while ensuring the rail ring 302 is maintained in the proper location.

Each of the components of the rail ring 302 can be made of a plurality of materials. For instance, the entire rail ring assembly can be constructed of steel, aluminum, high-density polyethylene (HDPE), ultra-high-molecular-weight polyethylene (UHMW), or any other material or combination of materials. The specific material of the rail ring can vary as long as has the necessary thermal tolerances for the application and it can provide sufficient structural support to restrict a covering from contacting the axis joint. Further, the rail rings provide a base structure that a cover can be coupled to via snaps, hooks or the like. The rail system allows any covers for the robotic member to be coupled to the robotic member and encompass an axis point while simultaneously preventing the covers from getting caught, snagged, or worn in the axis joint.

Figure 5:
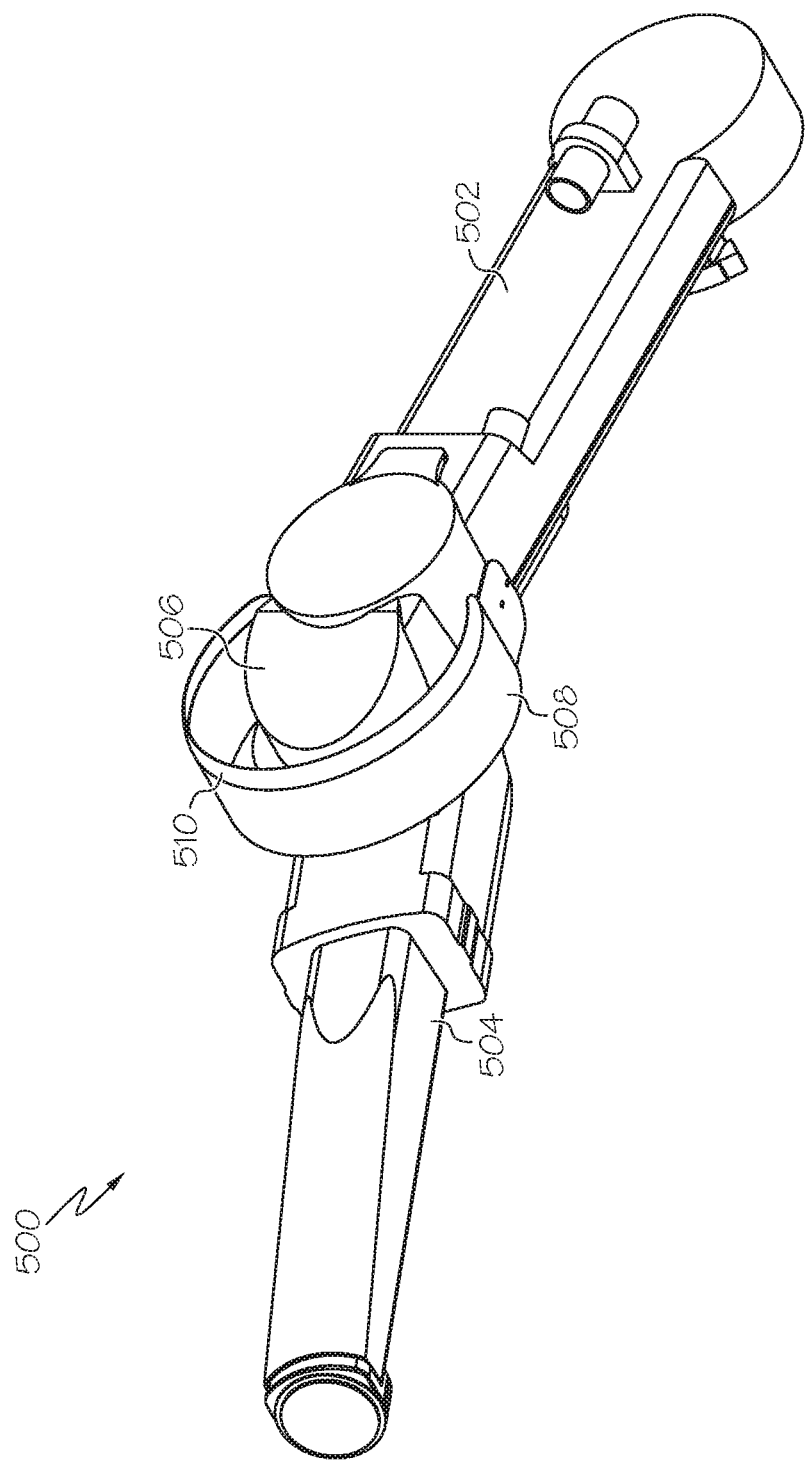
FIG. 5 is a perspective view of a ring shield assembly coupled to a robotic arm in accordance with the teachings of the present disclosure.
Figure 6:
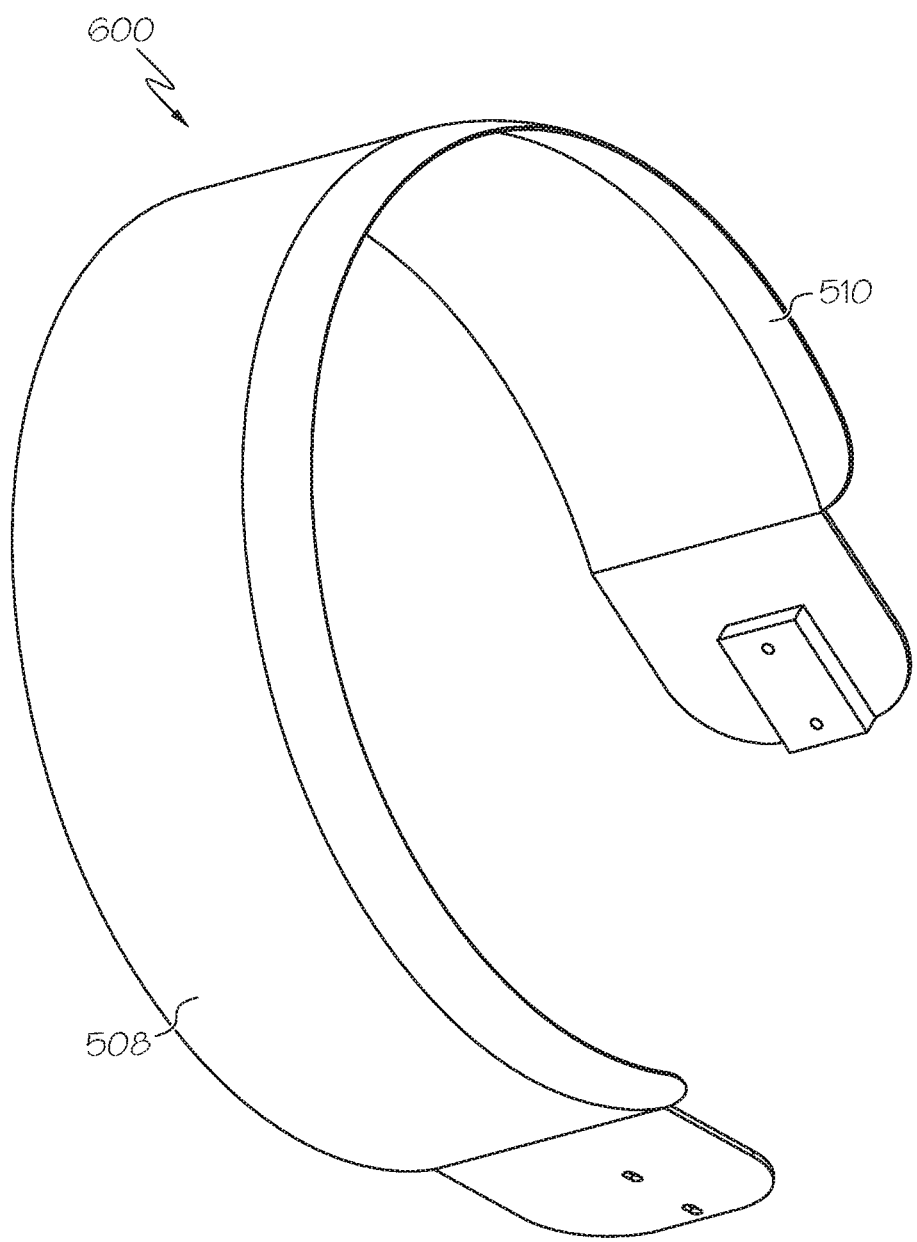
FIG. 6 is a detailed perspective view of the ring shield assembly of FIG. 5.
Figure 7:
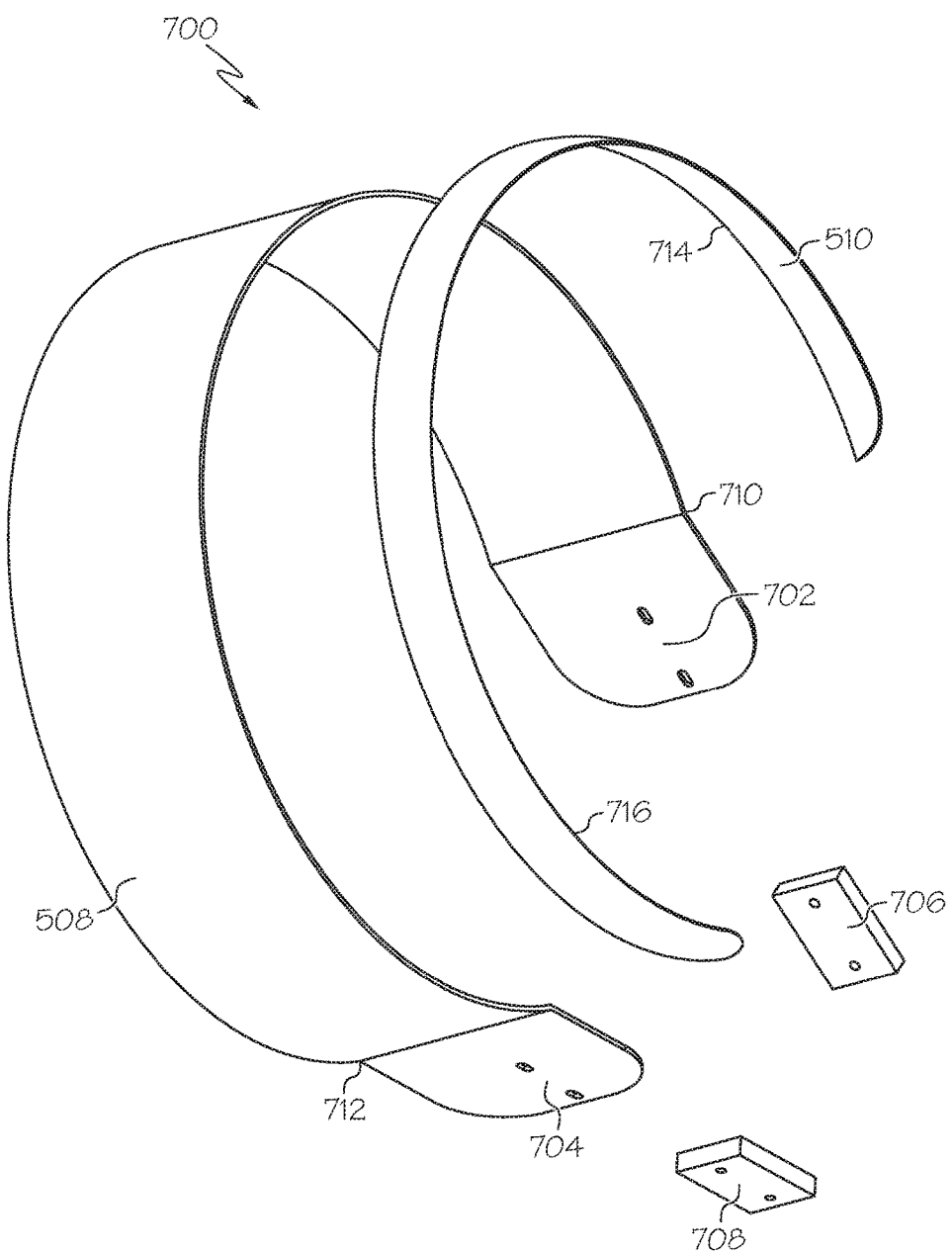
FIG. 7 is an exploded perspective view of the ring shield assembly of FIG. 6.

FIGS. 5-7 illustrate yet another embodiment of the present disclosure. Specifically FIG. 5 illustrates a robotic shield guard assembly 500. The robotic shield guard assembly 500 can comprise of a first arm extension portion 502 and a second arm extension portion 504. The first arm extension portion 502 and the second arm extension portion 504 may be pivotally coupled to one another at a pivot axis 506. Further, a ring shield 508 may at least partially encompass the pivot axis 506. The ring shield may have a ring shield lip 510 located on an outermost edge of the ring shield 508.

FIG. 6 illustrates a complete ring shield 600 independent of a parent member. FIG. 7 illustrates in more detail the ring shield 508 by showing an exploded shield guard 700 with each component separated from one another. The exploded shield guard 700 illustrates the ring shield 508, the shield guard lip 510, a first support plate 706, and a second support plate 708.

In accordance with certain embodiments herein, the ring shield 508 can be a semicircular member that has a first couple point 702 and a second couple point 704 at opposing ends. According to this illustrative embodiment, the first couple point 702 and the second couple point 704 can be comprised of tabs that extend radially outward from the semicircular ring shield 508 at a first joint 710 and a second joint 712. The first joint 710 and the second joint 712 can be formed as bends in the ring shield 508 or, in the alternative, the first joint 710 and the second joint 712 can be weld or glue joints where the first couple point 702 and the second couple point 704 comprise a separate piece than the ring shield 508.

The ring shield 508 can have a ring shield lip 510 coupled to an edge of the ring shield 508. The ring shield lip 510 can have a semicircular first edge 714 that substantially matches the semicircular portion of the ring shield 508. The first edge 714 can be a separate component coupled to the ring shield 508 using a plurality of methods (i.e. welding, gluing, fastening or the like) or, in the alternative, the ring shield guard 510 could consist of substantially the same piece as the ring shield 508. Further, the ring shield lip 510 can have a semicircular second edge 716 that has a slightly smaller diameter than the first edge 714. The ring shield lip 510 can be slightly arced between the first edge 714 and the second edge 716. The ring shield lip 510 can provide a somewhat rounded outer edge of the ring shield 508 that allows hoses, wires, covers and the like to easily go over the complete shield guard 600 without snagging or tearing.

The first couple point 702 and the second couple point 704 can comprise a plurality of through holes that allow the complete shield guard 600 to be removably coupled to the first arm extension portion 502. A first spacer plate 706 and a second spacer plate 708 can be located between the shield guard shield 508 and the first arm extension portion 502 when the complete shield guard 600 is coupled to the first arm extension portion 502. The first spacer plate 706 and the second spacer plate 708 can properly space the complete shield guard 600 around the pivot axis 506 of the first arm extension portion 502 and the second arm extension portion 504 to allow a full range of motion without contact to the complete ring assembly 600. Further, one skilled in the art can understand that the spacers can be utilized to adapt the shield guard 600 to fit a plurality of applications, and further still, no spacers may be needed in certain applications of the shield guard 600.

One of the beneficial uses of the complete shield guard 600 described above is its ability to shield the axis joints of automated machines with a wider exterior face. To that end, the exact dimensions of a particular shield guard will vary per the automated environment it was designed for. One skilled in the art will understand that the exact diameter of the arc, the thickness of the ring shield 508, and the location of the spacer plates 706, 708 will vary from one application to the next and should not view the dimensional specifics of this disclosure as limiting. Further the specific material or materials used to construct the complete shield guard 600 can vary from application to application. For example, the materials used for a complete ring shield 600 may be sufficient to withstand the heat and potential slag spatter of a welding application while in a painting application the materials may not need such thermal properties.

Figure 8:
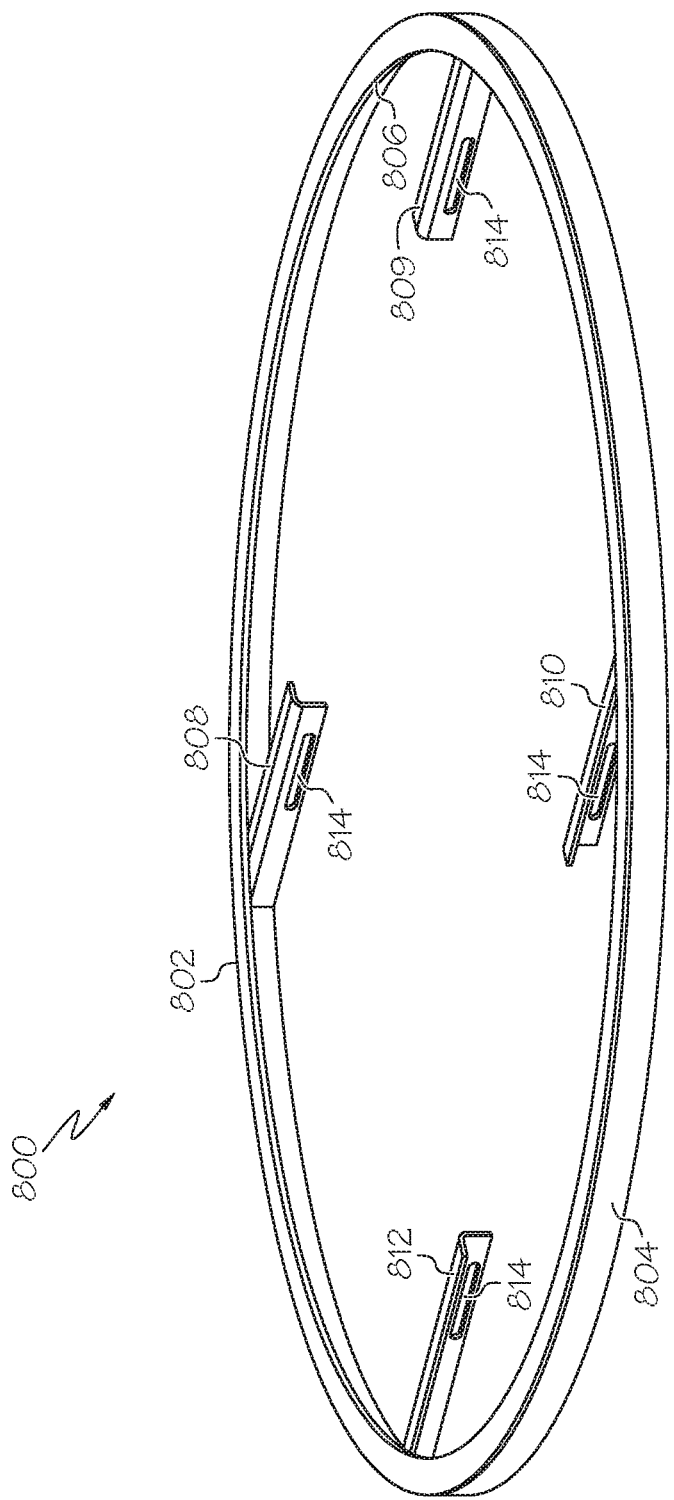
FIG. 8 is a detailed perspective view of a planar ring assembly in accordance with the teachings of the present disclosure.

In accordance with yet another embodiment as shown in FIG. 8, a planar ring 800 is illustrated and consists of a first ring member 802 and a second ring member 804. The first ring member 802 and the second ring member 804 can be substantially semi-circular in shape with a diameter greater than the parent member (not shown) they are designed to encompass. The first ring member 802 and the second ring member 804 can be coupled to one another to form a substantially complete circle. Further, when the first member 802 and the second member 804 are coupled to one another, a first internal brace 808, second internal brace 809, third internal brace 810, and fourth internal brace 812 can extend towards the interior region of the planar ring 800.

In accordance with certain embodiments herein, the internal braces (808, 809, 810, and 812) and the ring members (802 and 804) can have a substantially L-shaped cross-section. Moreover, the first ring member 802 and the second ring member 804 can have a lip 806 of the L-shaped cross-section protruding into the interior portion of the first ring member 802 and the second ring member 804.

The first internal brace 808 and the second internal brace 809 can be coupled to an interior portion of first ring member 802 and be substantially collinear with respect to one another. The portion of the first internal brace 808 and the second internal brace 809 that is perpendicular to the plane created by the first ring member 802 and the second ring member 804 can have a slotted hole 814 that allows the first internal brace 808 and the second internal brace 809 to be removably coupled to a parent member, such as a piece of robotic equipment. Accordingly, the parent member can have corresponding holes to removably couple the first ring member 802 thereto.

The third internal brace 810 and the fourth internal brace 812 can similarly be coupled to an interior portion of the second ring member 804 in a collinear orientation to one another. Each of the third internal brace 810 and the fourth internal brace 812 can also have a slotted hole 814. When the first internal brace 808, the second internal brace 809, the third internal brace 810, and the fourth internal brace 812 are coupled to the parent member, the first ring member 802 and the second ring member 804 can be removably coupled to one another to form a substantially circular ring encompassing the parent member. The slotted holes 814 allow the planar ring 800 to be removably coupled to the parent member while allowing the planar ring to be adjusted to several locations.

The lip 806 and the radially exterior portion of the first ring member 802 and the second ring member 804 can provide guidance or a coupling location for protective covering for the parent member. The lip 806 and exterior portion can have snaps, hooks, loops, zippers or any other known coupling method to allow a protective cover to be removably coupled thereto. Further, the planar ring 800 may not be coupled to any protective cover but rather act as a spacer, keeping the cover from contacting the axis joint.

Figure 9:
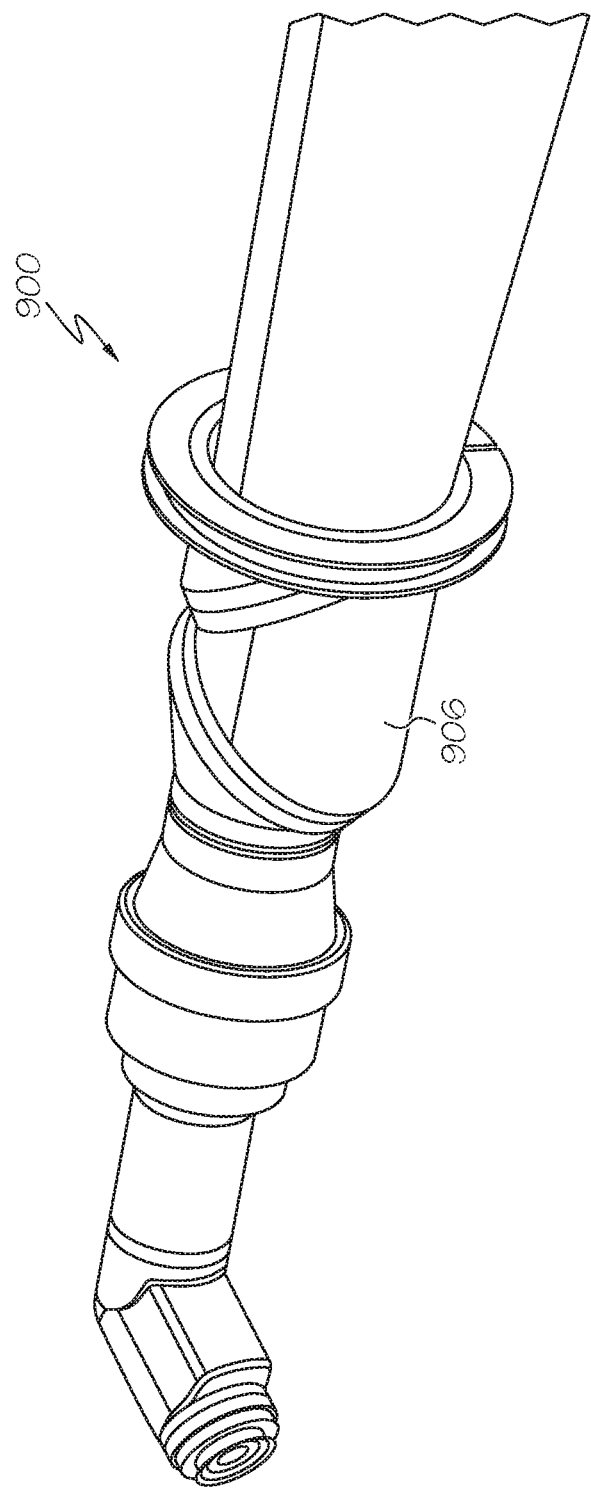
FIG. 9 is a perspective view of a wrist ring assembly coupled to a robotic arm in accordance with the teachings of the present disclosure.

In accordance with another embodiment as shown in FIGS. 9-19, a wrist ring assembly 900 for a wrist joint of a robotic arm member is shown. In accordance with this embodiment, the wrist ring assembly 900 has an inner ring portion 902 and an outer ring portion 904. In accordance with certain aspects of the present disclosure, and as is specifically shown in FIG. 9, the wrist ring assembly 900 is configured to be releasably coupled to a piece of machinery that articulates about one or more axis points during its programmed operation. As is specifically shown within FIG. 9, in accordance with one illustrative embodiment, the wrist ring assembly 900 is coupled to an automated robotic arm 906. While FIG. 9 shows the wrist ring assembly 900 already assembled onto the robotic arm 906, those of skill in the art will understand and appreciate herein that the ring assembly 900 can be attached to a piece of machinery by manually separating two ends of the ring so that a gap large enough to permit the ring to be slid onto the arm is created. More particularly, according to this illustrative aspect, the inner ring portion 902 is a substantially circular arc having a first end 908 and a second end 910, wherein the first and second ends are separated by a gap 911. The first end 908 has a first face 912 and the second end 910 has a second face 914 that is substantially parallel to the first face 912. As is explained above, to install the inner ring portion 902 onto the robotic arm 906, the first end 908 can be separated from the second end 910 such that the gap 911 between the first face 912 and the second face 914 increases in size (i.e., the distance between the two faces 912, 914 increases). As is also explained in detail above, those of skill in the art will understand and appreciate herein that using a flexible yet rigid material (e.g., a thermoplastic material, such as UHMW HDPE) will allow the ends 908, 910 to be separated during installation, yet will not damage the shape of the circular arc due to the inherent elasticity of the material.

After the ring assembly 900 is coupled to the robotic arm 906, in accordance with certain aspects of the present disclosure, the inner ring portion 902 is configured to be tightened against the robotic arm until a pressure-tight engagement is achieved. This pressure-tight engagement is accomplished by placing the inner ring portion 902 around the outer periphery of the robotic arm 906 and then tightening the inner ring portion 902 until it engages the surface of the robotic arm. To achieve this pressure-tight engagement, the first end 908 can be threaded to the second end 910 via a threaded fastener, such as a screw. For instance, and as is particularly shown within FIGS. 15 and 16, in accordance with certain aspects of the present disclosure, the first end 908 of the inner ring portion 902 has a through-hole 916 that is adapted to receive a threaded member 946 (such as a screw). While not required herein, in accordance with certain aspects of the present disclosure, the through-hole 916 can be a threaded through-hole that is configured to engage threads on the exterior of the threaded member 946.

Figure 15:
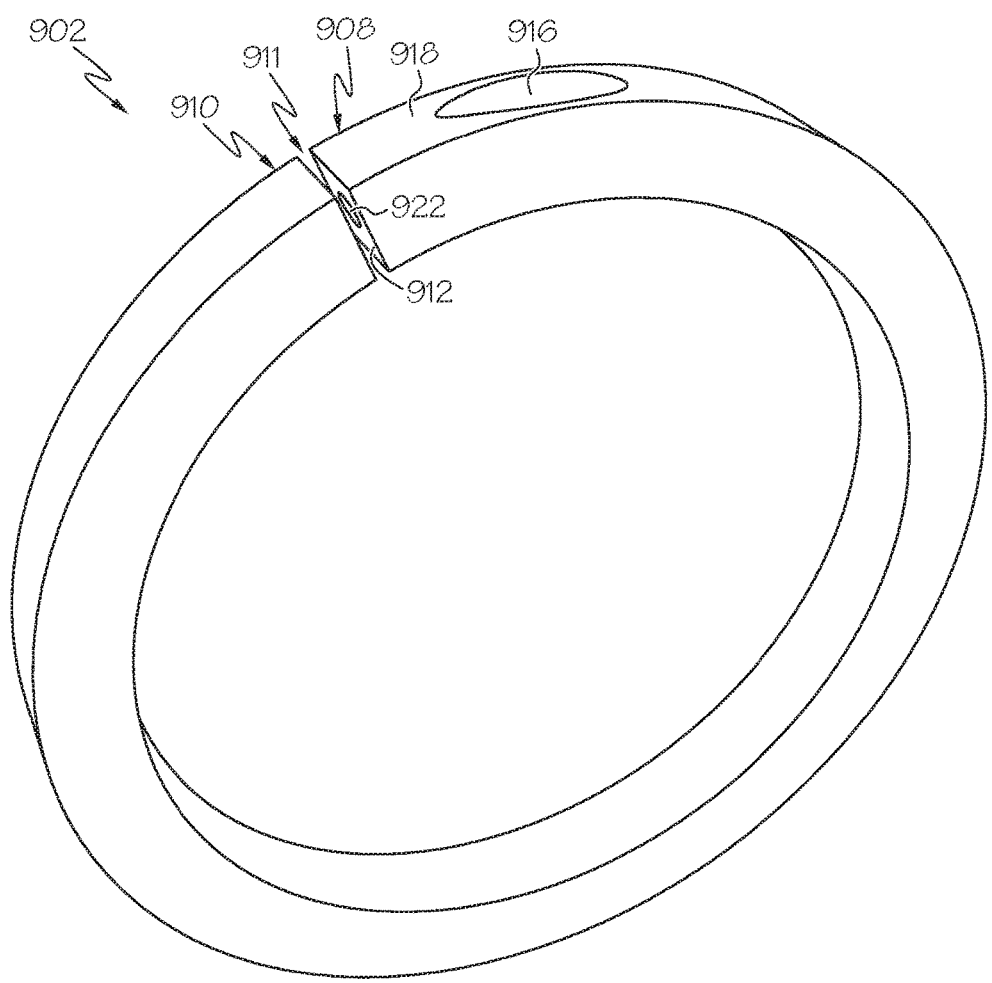
FIG. 15 is another perspective view of the inner wrist ring of FIG. 13.
Figure 16A:
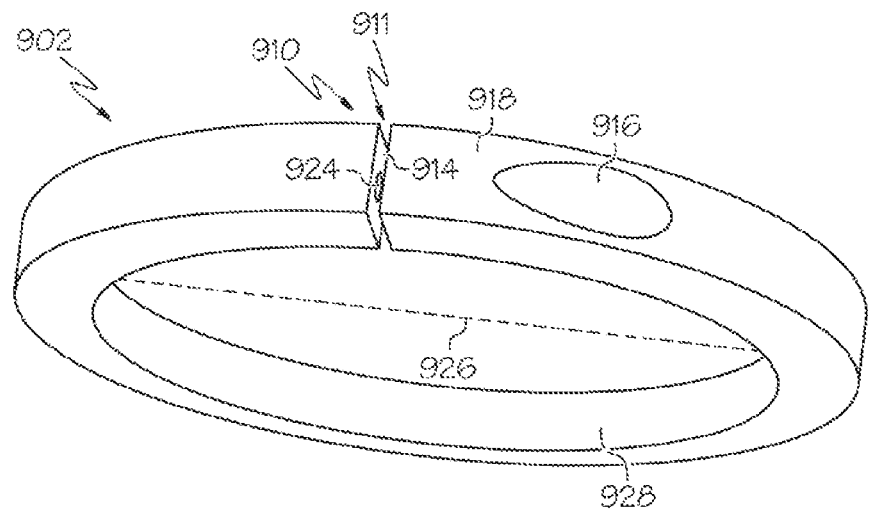
FIG. 16 is yet another perspective view of the inner wrist ring of FIG. 13.
Figure 16B:
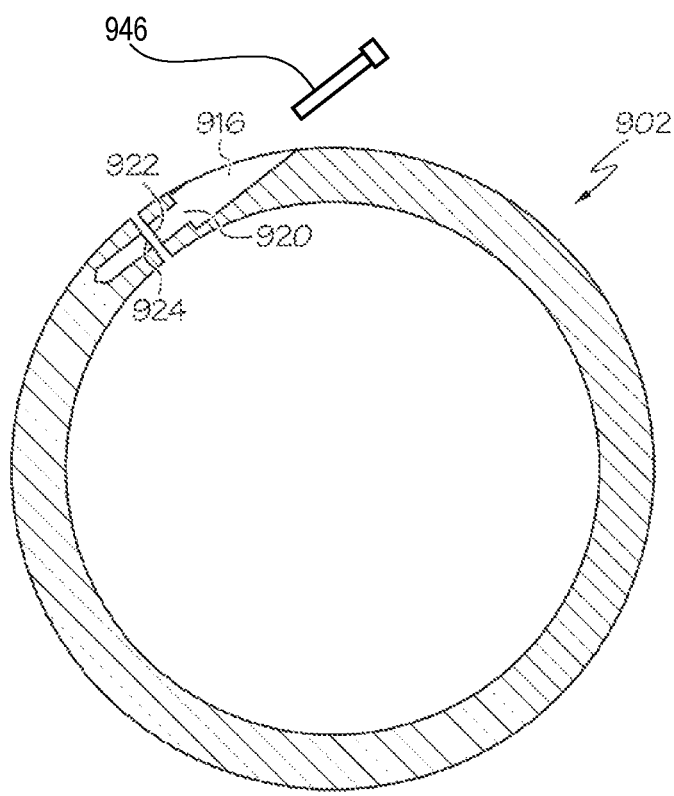
Figure 17:
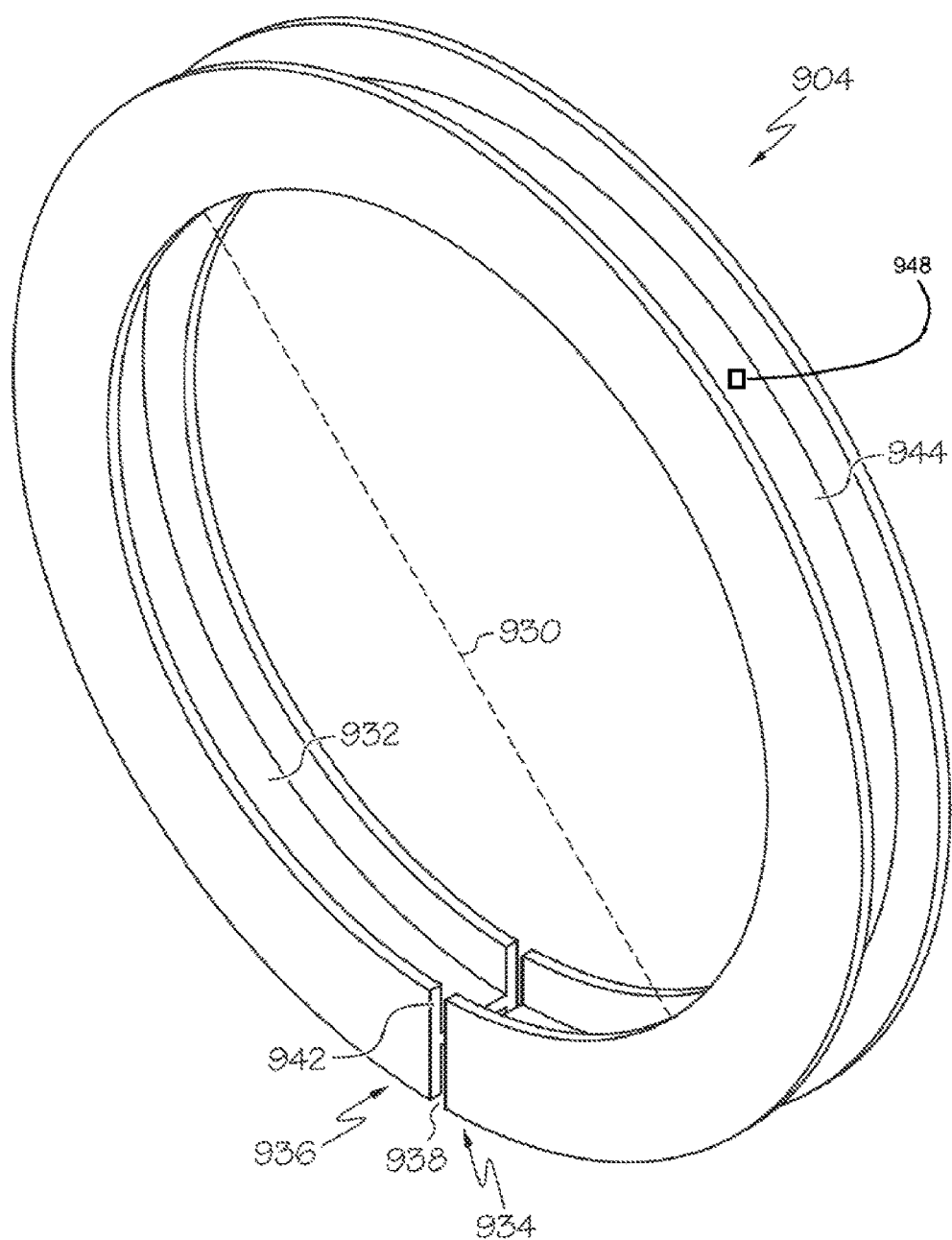
FIG. 17 is a perspective view of an outer wrist ring in accordance with the teachings of the present disclosure.
Figure 18:
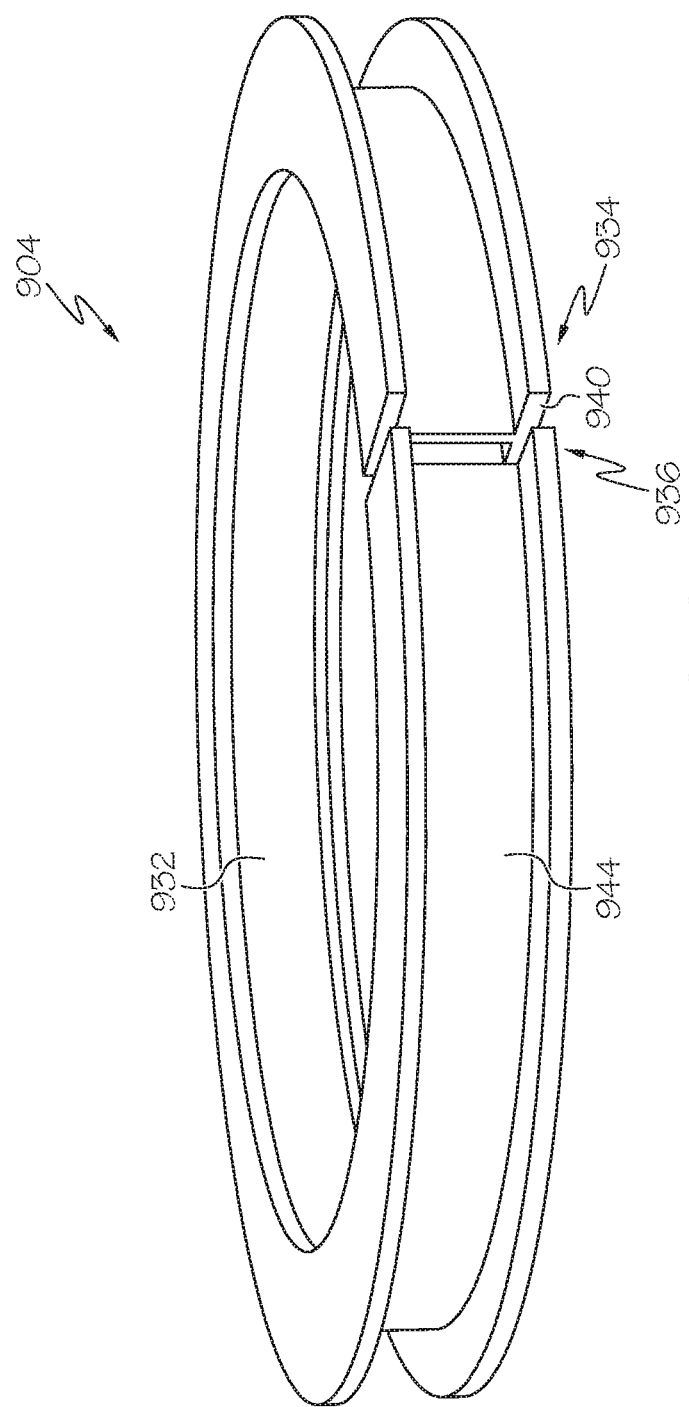
FIG. 18 is another perspective view of the outer wrist ring of FIG. 17.
Figure 19:
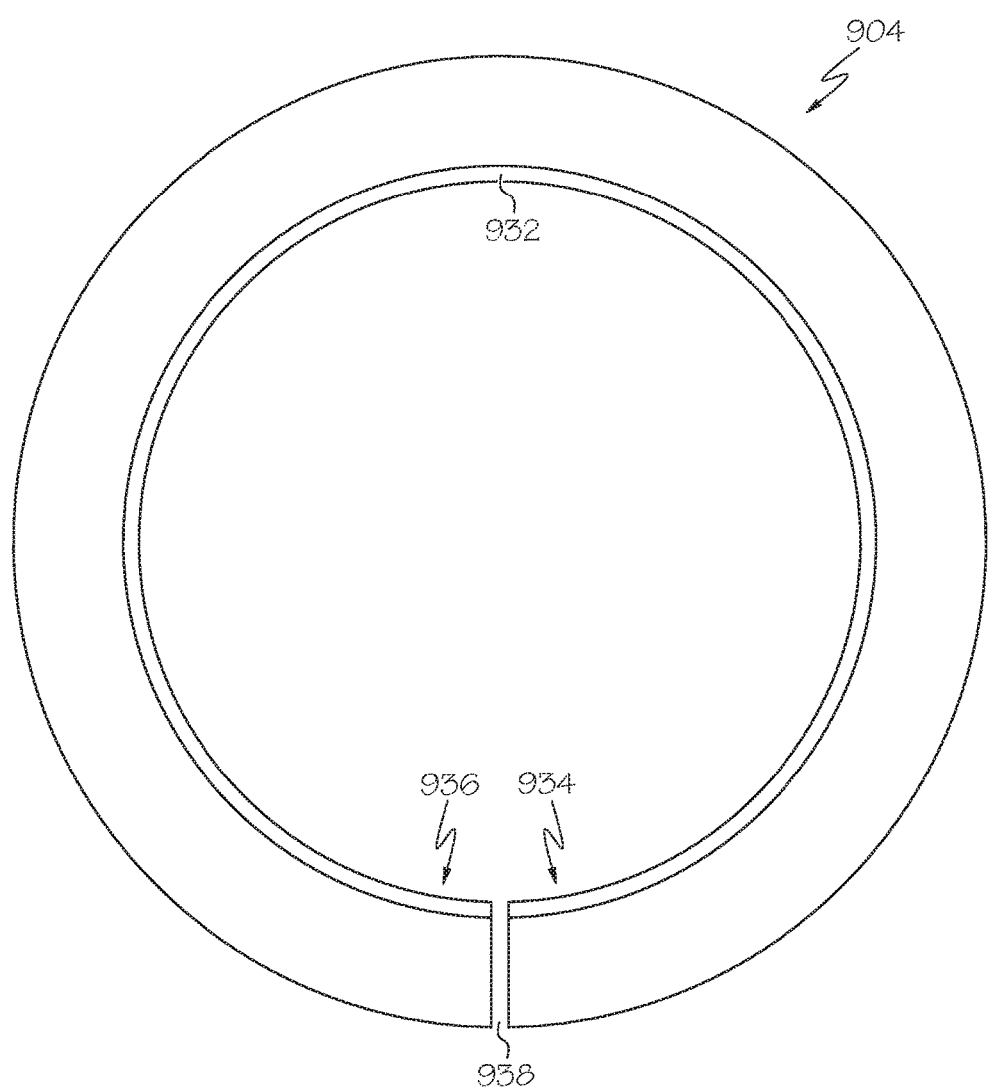
FIG. 19 is a top view of the outer wrist ring of FIG. 17.

As shown in FIG. 15, the through-hole 916 passes through a top surface 918 of the inner ring portion 902 proximate the first end 908 at a first opening 920 and then exits the first end 908 of the ring portion at the first face 912 through a second opening 922. The threaded member 946 then enters a threaded blind bore hole 924 that commences at the second face 914 of the second end 910. As those of skill in the art will understand and appreciate herein, as the threaded member 946 engages the threads of the blind bore hole 924 as part of a tightening process, the gap 911 will be decreased as the first and second faces 912, 914 are brought into close or actual contact with one another. As the faces 912, 914 are brought toward one another; the internal diameter 926 of the inner ring portion 902 is contracted, thereby causing the inner surface 928 of the ring portion to frictionally engage the outer surface of the robotic arm 906.

Figure 10:
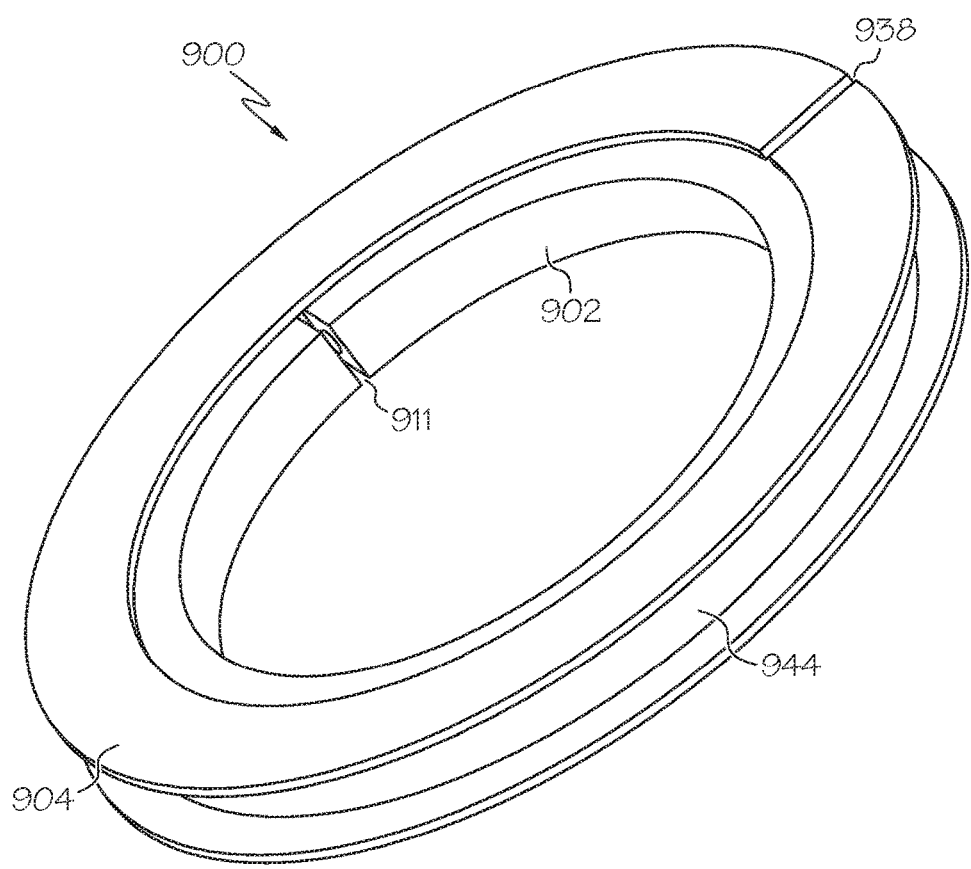
FIG. 10 is a perspective view of the wrist ring assembly of FIG. 9.
Figure 11:
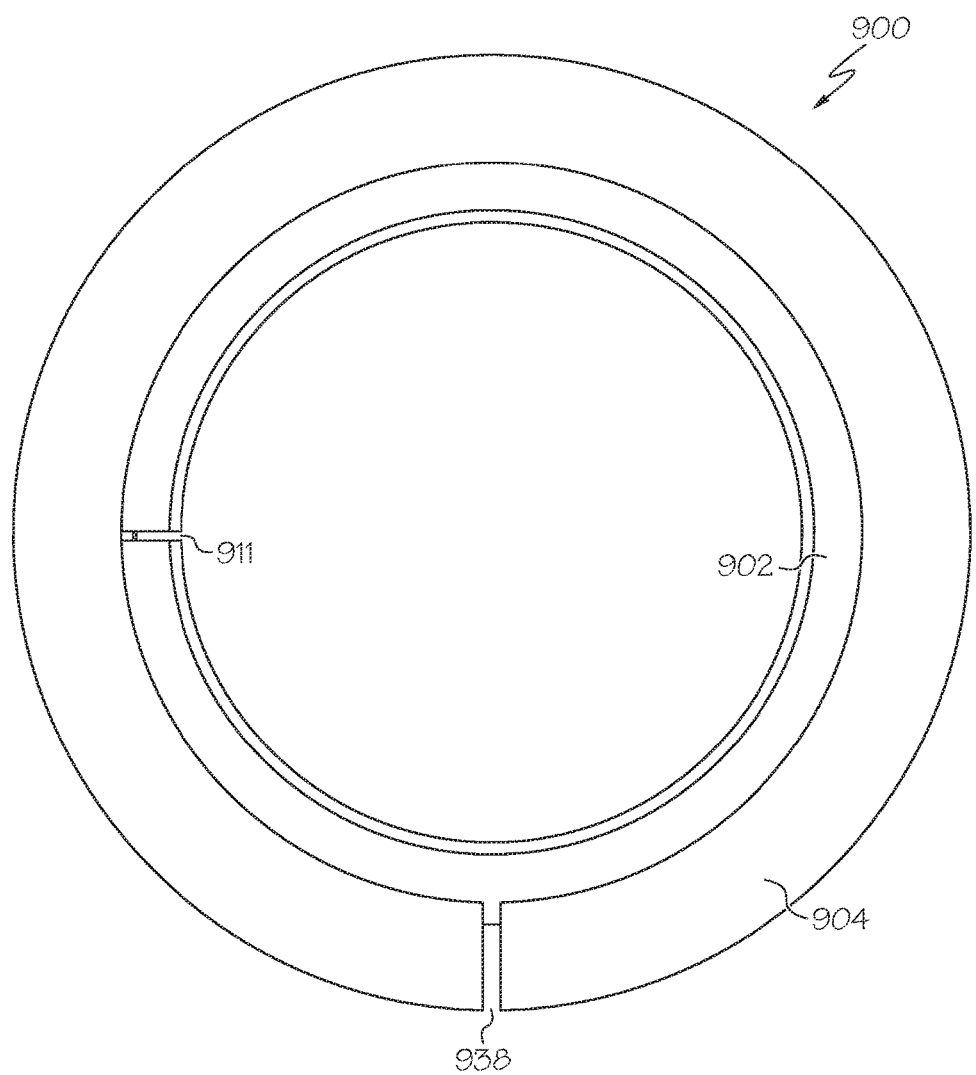
FIG. 11 is a top view of the wrist ring assembly of FIG. 9
Figure 12:
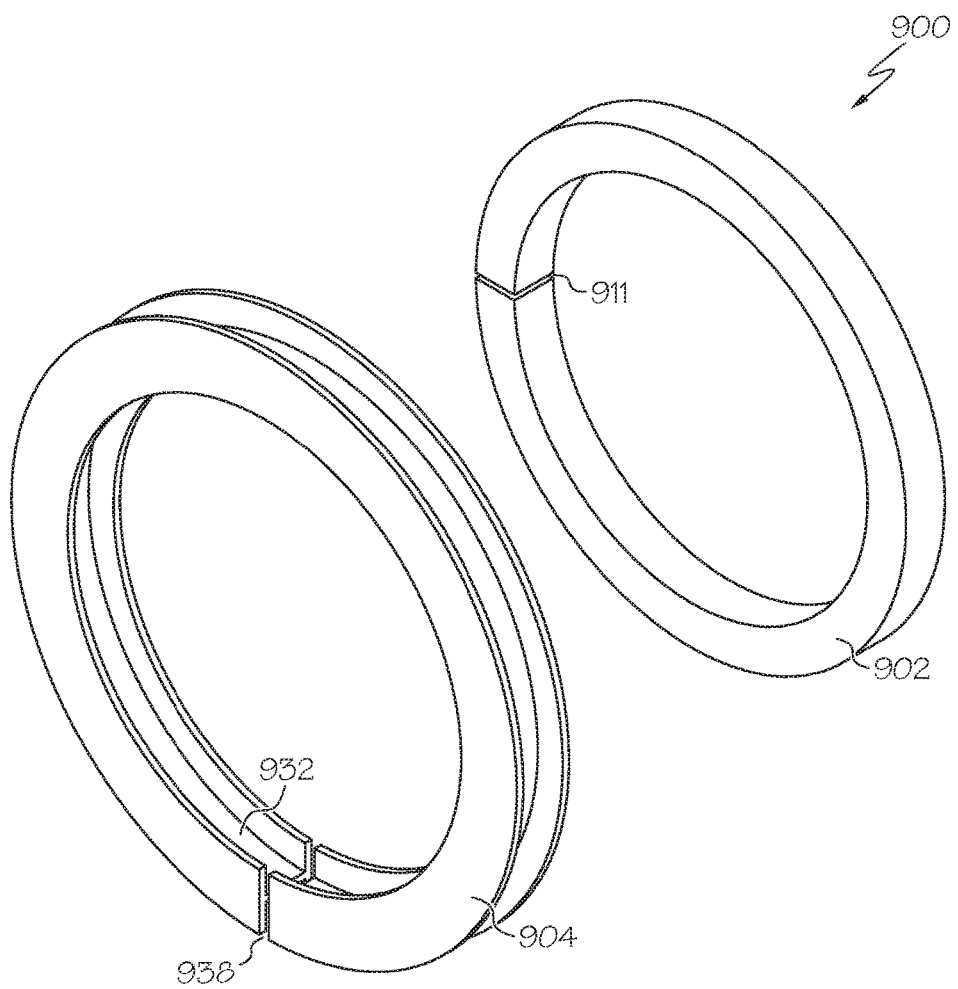
FIG. 12 is an exploded perspective view of the wrist ring assembly of FIG. 9
Figure 13:
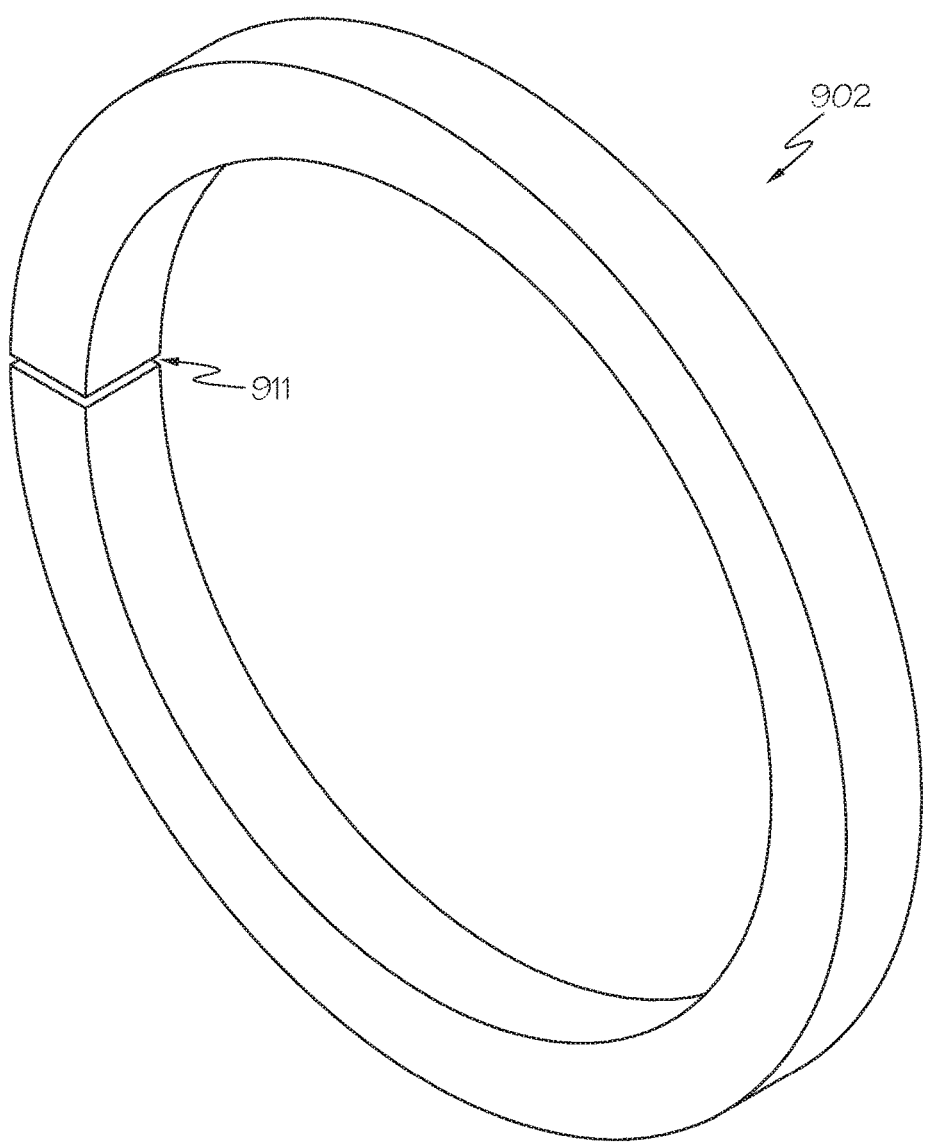
FIG. 13 is a perspective view of an inner wrist ring in accordance with the teachings of the present disclosure.
Figure 14:
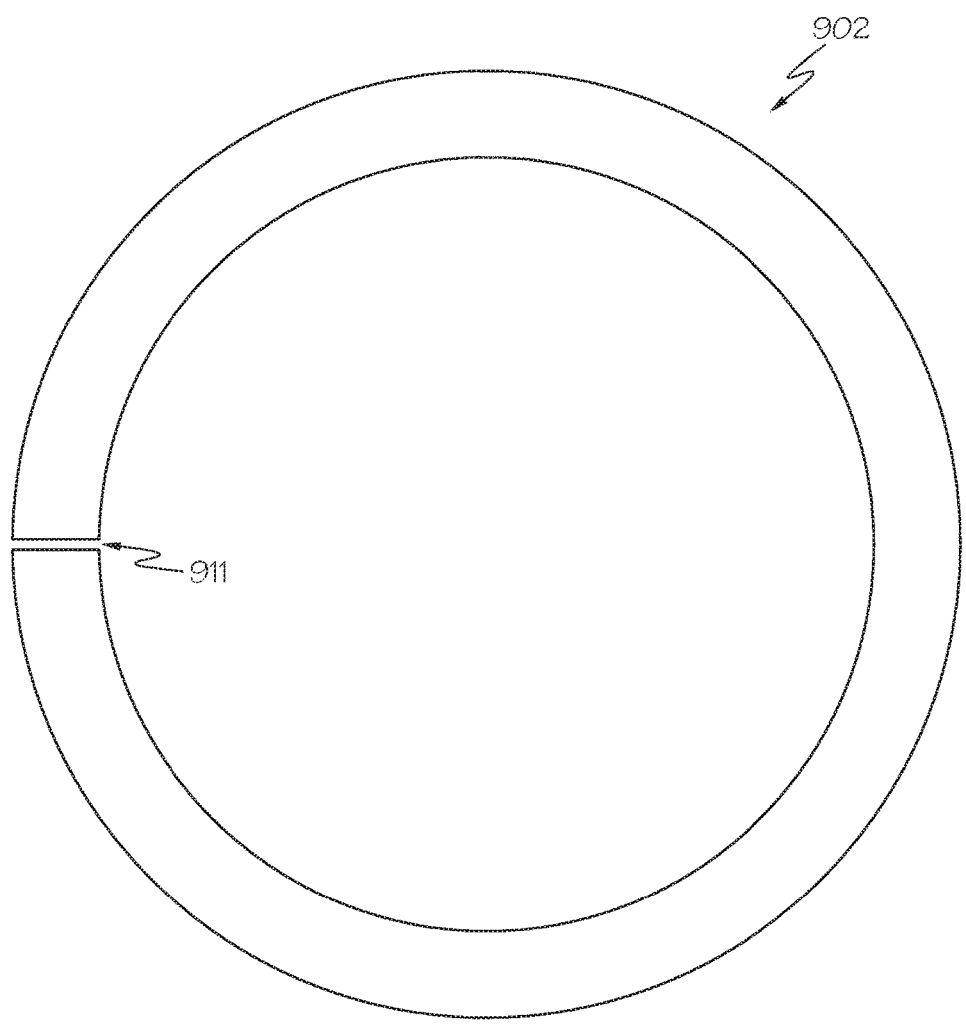
FIG. 14 is a top view of the inner wrist ring of FIG. 13.

In addition to the inner ring portion 902, the ring assembly 900 also includes an outer ring portion 904 that is configured to house the inner ring portion 902 within its internal circumferential periphery 930. More particularly, the outer ring portion 904 includes a groove or substantially U-shaped channel 932 on its internal circumferential periphery 930 that is adapted to receive the inner ring portion 902 during assembly. In accordance with certain aspects herein, the dimensions of the inner ring portion 902 can be configured such that the inner ring portion is able to achieve a snap-fit engagement with the outer ring portion 904. As is shown in FIGS. 10 and 11, for instance, the inner ring portion 904 is at least partially housed within the groove/channel 932 during assembly. Once the ring assembly 900 is installed onto a piece of robotic equipment (such as robotic arm 906, for instance), the inner portion 904 is forced to move in coordination with the machinery as it pivots about its various pivot axis points, particularly because the inner ring portion 902 is fixedly secured against the surface of the machinery once installed. The outer ring portion 904, on the other hand, is configured to stay in place and remain stationary as the as the inner ring portion freely rotates about and spins within the outer ring's inner channel 932.

Much like the inner ring portion 902, the outer ring portion 904 has a first end 934 and a second end 936, wherein the first and second ends are separated by a gap 938. The first end 934 has a first face 940 and the second end 936 has a second face 942 that is substantially parallel to the first face 940. To install the outer ring portion 904 onto the inner ring portion 902, the first end 934 can be separated from the second end 936 such that the gap 938 between the first face 940 and the second face 942 increases in size (i.e., the distance between the two faces 940, 942 increases). As is also explained in detail above, those of skill in the art will understand and appreciate herein that using a flexible yet rigid material (e.g., a thermoplastic material, such as UHMW HDPE) will allow the ends 934, 936 to be separated during installation, yet will not damage the shape of the circular arc due to the inherent elasticity of the material.

In accordance with certain aspects herein, the outer ring portion 904 can include a second channel 944 opposite the inner channel 936 that is configured to allow the outer ring to be coupled to a protective covering or other such piece of external machinery. More particularly, in accordance with certain aspects herein, the outer ring portion 904 is configured to provide a base structure that a protective covering can be coupled to via snaps, hooks or the like. To accomplish this attachment, the outer ring portion 904 can have snaps, hooks, loops, zippers or any other known coupling method 948 to allow a protective cover to be removably coupled thereto. Further, in accordance with certain other embodiments, the ring assembly 900 may act as a spacer to keep the cover from contacting the axis joint instead of having the cover attached directly thereto. As such, the present disclosure is not intended to be limited herein.

While several embodiments of the present disclosure have been illustrated and described in detail, the invention should not be limited to such embodiments. The particular materials used for the above embodiments and any variation therein can include, but should not be limited to steel, aluminum, high-density polyethylene (HDPE), ultra-high-molecular-weight polyethylene (UHMW), or any other material or combination of materials. Further, the exact diameter, arc length, exterior thickness, and support structure design for the above embodiments will vary depending on the exact application. Lastly, the embodiments may be a plurality of sizes sufficient to adequately protect the axis joint while simultaneously allowing a full range of motion.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A protective covering support structure for a robotic arm, comprising:
   a first ring member having an inner channel extending substantially along an inner circumferential periphery and an outer channel having snaps, hooks, loops, or zippers positioned thereon and configured to couple a protective covering to the first ring member; and
   a second ring member sized to be housed at least partially within the inner channel of the first ring member, the second ring member having a first end and a second end, the first and second ends being separated by a gap;
   wherein, the gap is the only discontinuity of the second ring;
   further wherein, the second ring member is coupled to the robotic arm by reducing the gap separating the first and second ends with a threaded member while the robotic arm is positioned within the second ring.

2. The protective covering support structure of claim 1, wherein the second ring member has a through-hole configured to receive the threaded member through a first opening.

3. The protective covering support structure of claim 2, wherein the through-hole exits the first end of the second ring member.

4. The protective covering support structure of claim 2, wherein the second ring member further includes a threaded bore hole, the threaded bore hole being configured to receive the threaded member.

5. The protective covering support structure of claim 4, wherein the threaded bore hole is a blind bore hole.

6. The protective covering support structure of claim 4, wherein the threaded bore hole commences at the second end of the second ring member.

7. The protective covering support structure of claim 1, wherein at least one of the first ring member and the second ring member is made from a thermoplastic material.

8. The protective covering support structure of claim 1, wherein the thermoplastic material is polyethylene.

* * * * *